United States Patent [19]

Vrevich

[11] Patent Number: 5,701,977
[45] Date of Patent: Dec. 30, 1997

[54] ESTOP—EMERGENCY STOPPING DEVICE FOR MOTORIZED UNCAGED VEHICLES

[76] Inventor: Theodore Shane Vrevich, West 5895 Clemetson Rd., Coeur D'Alene, Id. 83814

[21] Appl. No.: 730,347

[22] Filed: Oct. 15, 1996

Related U.S. Application Data

[60] Provisional application No. 60/005,760 Oct. 20, 1995.
[51] Int. Cl.$^6$ .................... F16D 65/14; F16D 55/08; B60K 28/00
[52] U.S. Cl. .................... 188/72.9; 188/167; 188/72.4; 188/106 R; 188/106 F; 180/272
[58] Field of Search ............... 188/72.1, 72.9, 188/106 R, 106 F, 109, 166, 167, 170, 171; 180/273; 303/19

[56] References Cited

U.S. PATENT DOCUMENTS

| | | | |
|---|---|---|---|
| 3,487,451 | 12/1969 | Fontaine | 180/273 |
| 3,749,207 | 7/1973 | Meyer et al. | 180/273 |
| 3,788,431 | 1/1974 | York | 188/109 |
| 3,892,294 | 7/1975 | Nieminski | 188/167 |
| 4,116,296 | 9/1978 | Pleir et al. | 303/19 |
| 4,476,964 | 10/1984 | Broman | 180/273 |
| 4,582,178 | 4/1986 | Huneault | 188/109 |
| 4,616,882 | 10/1986 | Bueno | 303/9.76 |
| 5,368,372 | 11/1994 | Cords et al. | 188/109 |
| 5,505,528 | 4/1996 | Hamman et al. | 188/353 |

*Primary Examiner*—Robert J. Oberleitner
*Assistant Examiner*—Chris Schwartz

[57] ABSTRACT

ESTOP is a braking device causing a motorized vehicle, such as a snowmobile or ATV, to stop when the driver is ejected. When the ESTOP is armed, with a trigger pin attached by a tether and clip to a driver, the vehicle braking system functions normally. When the driver is ejected, removing the trigger pin, the ESTOP, unarmed, releases a force applying pressure, mechanically or hydraulically, to brake pads stopping the vehicle's brake rotor and bringing the vehicle to rest. Mechanically, ESTOP applies pressure from a released spring to brake pads on a caliper mounted on the vehicle's brake rotor. Hydraulically, the ESTOP applies pressure from a released spring to the vehicle's hydraulic brake system through a secondary master cylinder. ESTOP potential energy is not limited to a coiled wire spring, but may include a compressed gas canister, engine provided vacuum or an electrical solenoid.

2 Claims, 3 Drawing Sheets

5,701,977

ESTOP— EMERGENCY STOPPING DEVICE FOR MOTORIZED UNCAGED VEHICLES

CROSS REFERENCE TO RELATED APPLICATIONS

This invention does not cross reference to any other previously submitted invention. This invention is the follow-up to Provisional Patent Application number 60/005,760 filed Oct. 20, 1995.

BACKGROUND—FIELD OF INVENTION

This invention relates to an emergency braking system to be utilized on snowmobiles, all terrain vehicles (ATV), and other motorized uncaged vehicles.

BACKGROUND—DESCRIPTION OF PRIOR ART

To the knowledge of this inventor no prior art directly germane to the ESTOP exists. The ESTOP provides a means of bringing to a stop a snowmobile or ATV when the driver has been ejected. Devices have been utilized that turn off the vehicle ignition when a driver is ejected. These devices are actuated by a lanyard attached to the driver and to an armed ignition switch. Although the engine is turned off upon driver ejection, a vehicle may continue traveling for a great distance before coming to a stop. The speed of a vehicle and the terrain grade may influence the traveled distance after driver ejection.

Instances where drivers have been ejected from snowmobiles, especially, have resulted in vehicles continuing considerable distances, often down steep inclines and ending up at the bottom of deep canyons.

OBJECTS AND ADVANTAGES

Accordingly, the objects and advantages of the ESTOP are to provide a means of braking a motorized uncaged vehicle to a stop after the driver has ejected either voluntarily or involuntarily.

The ESTOP would function most efficiently when actuated in conjunction with a device that turns off the engine ignition, thus not only eliminating the source of power—but providing a braking means of slowing to a stop the inertial force of a traveling vehicle's mass and acceleration.

Damage to life, vehicles, and the environment may be prevented through the use of an ESTOP when one is installed and actuated.

Further objects and advantages of ESTOP will become apparent from a consideration of the drawings and ensuing descriptions.

DESCRITPION OF DRAWINGS

The drawings shown are intended only to be a general representation of how the device can function.

Figure 1:
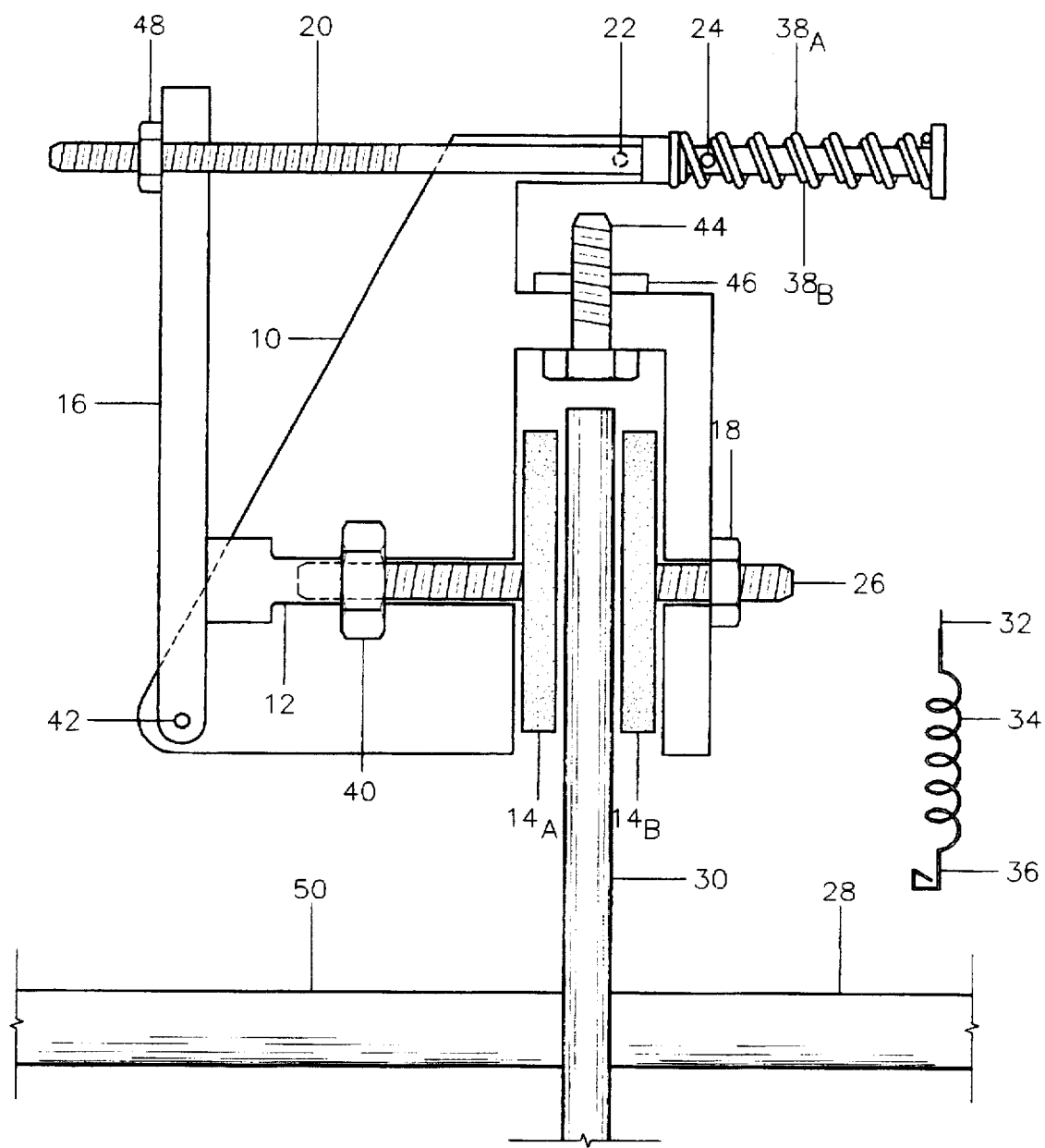
FIG. 1 is a drawing showing a section through a plan view of a manually operated brake caliper in the activated position in which the brake is applied.

| List of Reference Numerals in FIG. 1 | |
|---|---|
| PART NUMERAL | PART DESCRIPTION |
| 10 | disc brake caliper |
| 12 | main plunger |
| 14A | primary brake pad |
| 14B | secondary brake pad |
| 16 | actuating lever |
| 18 | securing nut |
| 20 | arming shaft |
| 22 | 3/16" hole in caliper |
| 24 | 1/8" hole in arming shaft |
| 26 | securing bolt |
| 28 | chain case shaft (existing) |
| 30 | brake rotor (existing) |
| 32 | trigger pin |
| 34 | tether |
| 36 | clip |
| 38A | primary spring |
| 38B | secondary spring |
| 40 | main plunger adjusting nut |
| 42 | 3/16" cotter pin |
| 44 | mounting bolt |
| 46 | mounting bracket |
| 48 | adjusting nut for arming shaft |
| 50 | drive shaft (existing) |

Figure 2:
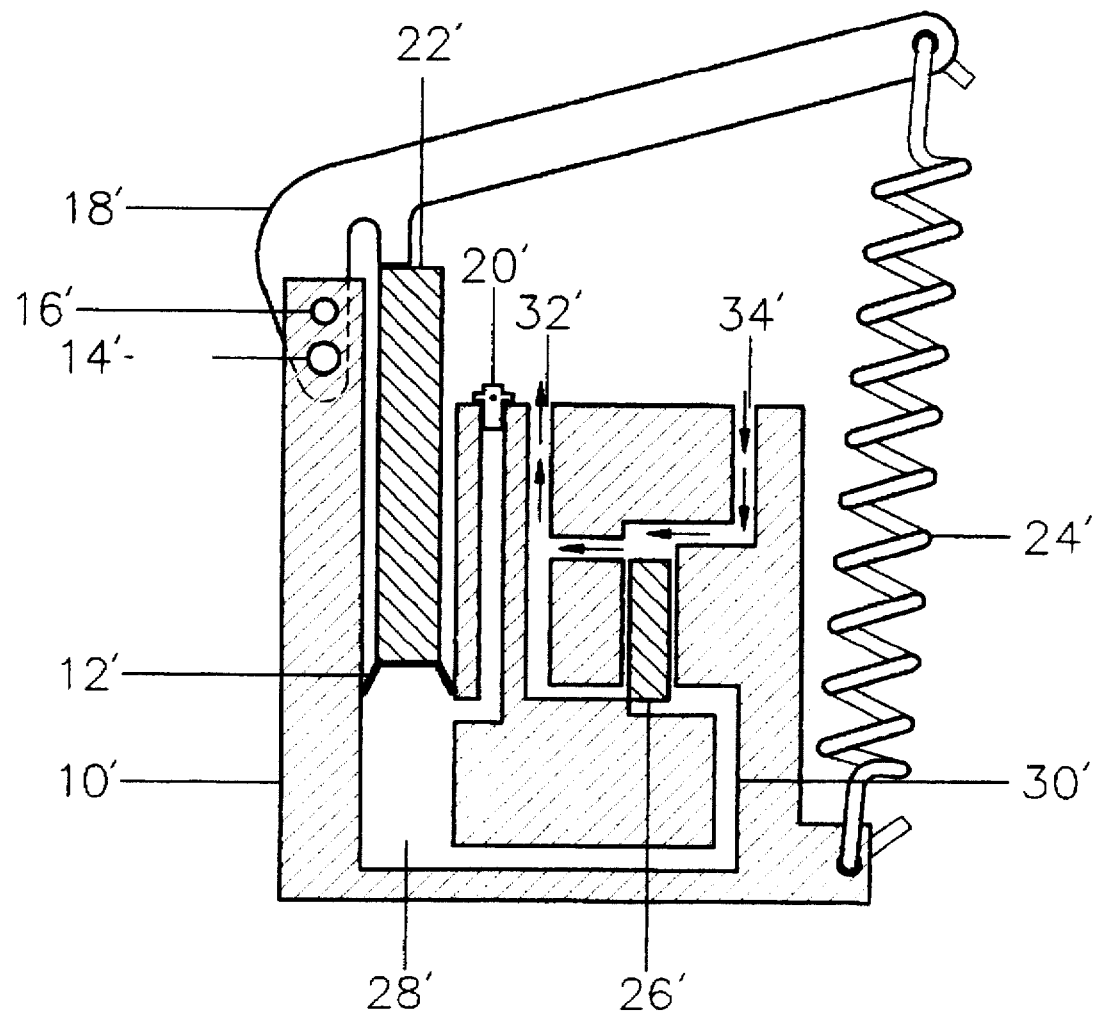
FIG. 2 is a drawing showing a section through a plan view of a secondary hydraulic master cylinder in the armed position.
Figure 3:
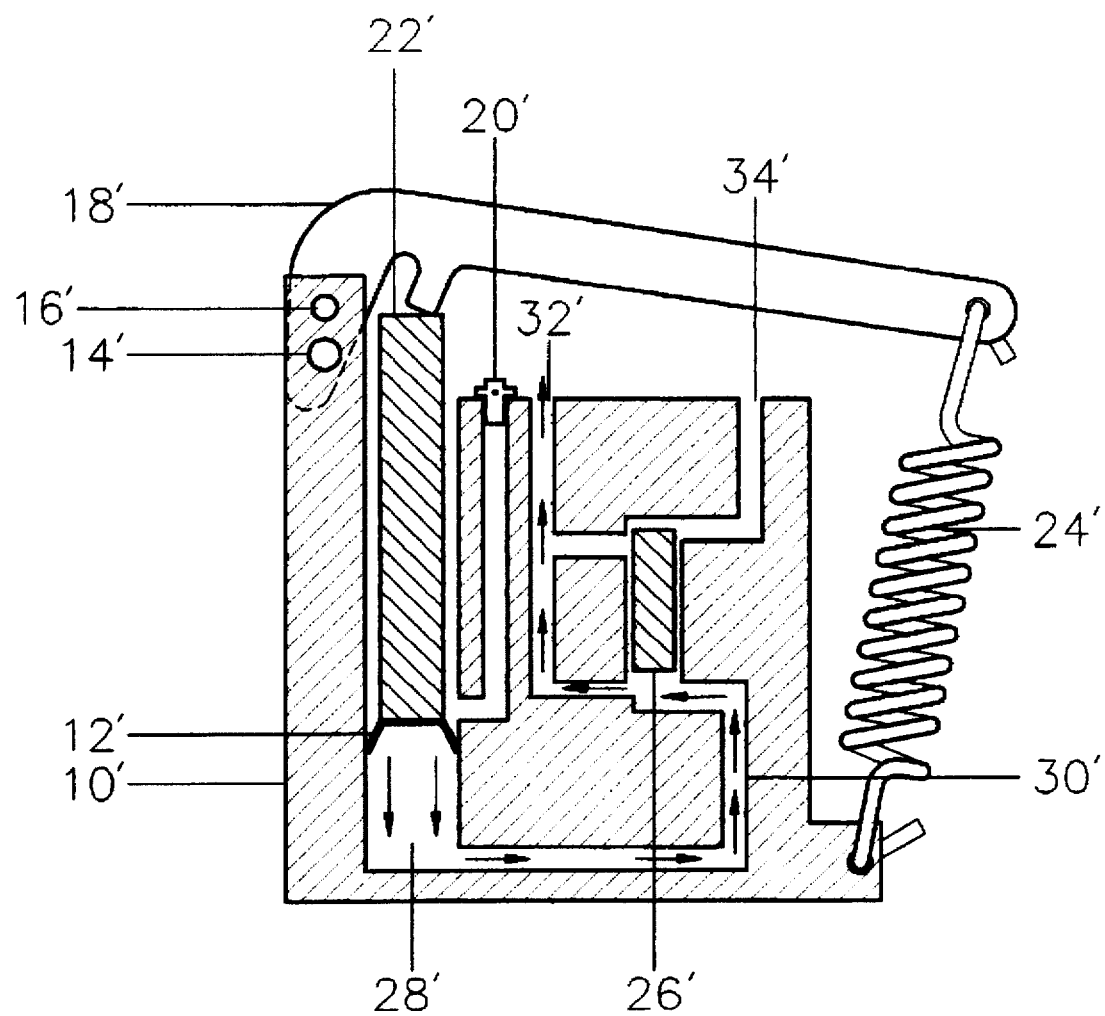
FIG. 3 is a drawing showing a section through a plan view of a secondary hydraulic master cylinder in an unarmed position.

| List of Reference Numerals in FIGS. 2 and 3 | |
|---|---|
| PART NUMERAL | PART DESCRIPTION |
| 10' | secondary master cylinder body |
| 12' | piston cup |
| 14' | pivot for actuator arm |
| 16' | trigger pin hole |
| 18' | actuator arm |
| 20' | bleeder (may also mount brake fluid reservoir here) |
| 22' | piston |
| 24' | spring |
| 26' | spool type shuttle valve |
| 28' | cylinder bore |
| 30' | secondary brake fluid port |
| 32' | caliper brake fluid port |
| 34' | primary brake fluid port |

SUMMARY

PREFERRED EMBODIMENT—DESCRIPTION

A preferred embodiment of the ESTOP invention is illustrated in FIG. 1, a section through a plan view of a manually operated brake caliper.

A disc brake caliper 10 is mounted on an existing brake rotor 30 and held in position by a mounting bracket 46. Mounting bracket 46 is attached to caliper 10 by a mounting bolt 44 and also attached to an existing frame of a motorized uncaged vehicle.

A main plunger 12 with an adjusting nut 40 are assembled to a primary brake pad 14A on one side of caliper 10. A securing bolt 26 and a securing nut 18 are assembled to a secondary brake pad 14B on the other side of caliper 10.

An actuating lever 16 is connected to caliper 10 by a cotter pin 42. An arming shaft 20 is attached through a hole in caliper 10 and a hole in an actuating lever 16.

A primary spring 38A and a secondary spring 38B rest on one end of an arming shaft 20. An adjusting nut 48 is positioned at other end of arming shaft 20. When armed, a hole 24 in arming shaft 20 is aligned with a hole 22 in caliper 10.

The ESTOP is maintained in armed position by insertion of a trigger pin 32 through hole 22 and hole 24. A tether 34 is attached to a trigger pin 32. A clip 36 attached to tether 34 is also attached to vehicle driver.

PREFERRED EMBODIMENT—OPERATION

The ESTOP illustrated in FIG. 1 when installed on a motorized uncaged vehicle is to provide a stopping force when a driver is ejected either voluntarily or involuntarily.

When ESTOP is armed, with braking force restrained, trigger pin 32 is secured through hole 22 and hole 24. Primary spring 38A and secondary spring 38B are compressed. Vehicle movement is unrestrained in its normal operation. Trigger pin 32, connected to tether 34 and clip 36, is attached to the vehicle driver.

When the driver is ejected from the vehicle either voluntarily or involuntarily clip 36, tether 34, and trigger pin 32 are pulled, releasing arming shaft 20. Compressed springs 38A and 38B expand with potential energy and move arming shaft 20, which applies force to actuating lever 16, which applies force to main plunger 12, which applies force to primary brake pad 14A and secondary brake pad 14B.

Brake pads 14A and 14B transmit pressure to rotating brake rotor 30 (existing) causing friction. Sustained pressure on brake pads 14A and 14B slows rotation of brake rotor 30 to a stop, thus stopping drive shaft 50 (existing) and chain case shaft 28 (existing). The motorized uncaged vehicle is braked to a stop in a distance dependent upon initial speed and surface conditions.

OTHER EMBODIMENTS

Other Embodiments—Description

Another embodiment of the ESTOP invention is illustrated in FIG. 2 and 3, sections through a plan view of a hydraulically operated secondary master cylinder.

Without a detailed description of the main parts and how the parts are connected, a List of Reference Numerals in FIGS. 2 and 3 has been provided.

Other Embodiments—Operation

FIG. 2 shows the ESTOP in an armed mode with brake fluid flowing from primary master cylinder (existing), entering secondary master cylinder body 10' at primary port 34', and exiting at caliper port 32'. From caliper port 32' brake fluid is routed to hydraulically actuated brake calipers (existing). Shuttle valve 26' is at this time blocking brake fluid from and to cylinder bore 28'. Trigger pin (not shown) is in hole 16'. Brakes on vehicle operate normally when ESTOP is in this mode.

FIG. 3 shows the ESTOP in an unarmed mode with brake fluid flowing from cylinder bore 28' and secondary brake fluid port 30'. Trigger pin (not shown) is removed from hole 16' allowing expanded spring 24' to retract, pulling actuator arm 18' toward piston 22'. Pressure is exerted on brake fluid in cylinder 28' by piston 22'. Shuttle valve 26' is forced to shift to the opposite port, closing primary port 34' and opening secondary port 30'. Brake fluid is pressurized at caliper port 32' and routed to hydraulically actuated brake calipers (existing). The motorized uncaged vehicle is stopped according to initial speed and surface conditions.

CONCLUSION, RAMIFICATIONS, AND SCOPE OF INVENTION

Accordingly, the reader will see that the Emergency Stopping Device ESTOP provides a means of braking a motorized uncaged vehicle to a stop after the driver has ejected either voluntarily or involuntarily. The preferred embodiment is a manually operated brake caliper assembled on a vehicle's existing brake rotor. Another embodiment is the utilization of a secondary master cylinder connected to the brake fluid line between a vehicle's primary master cylinder and a vehicle's brake caliper. Although both embodiments show reserve or latent energy for braking force supplied in the form of mechanical energy by a coiled wire spring, other sources of energy can be provided by the following:

1. compress gas (small canister)
2. vacuum (provided by engine)
3. electrical solenoid In all instances the armed ESTOP is actuated by a trigger pin extracted by a tether attached to the driver when the driver ejects from the vehicle.

For best stopping results, the ESTOP should be installed on vehicles equipped with an ignition shut off device, and should be utilized in conjunction with said device.

Although the description above contains many specificities, these should not be construed as limiting the scope of the invention but as merely providing illustrations of some of the presently preferred embodiments of this invention. For example, the manual brake caliper and the secondary hydraulic master cylinder can have other shapes and configurations.

Thus the scope of the invention should be determined by the claims to be filed later and their legal equivalent, rather than by the examples given.

What is claimed is:

1. A braking system for an all terrain vehicle comprising:
    a caliper, an arming shaft slidably connected to the caliper, an actuating lever connected to the caliper and attached at one end to the arming shaft, a connecting element connected to a brake pad and adapted to apply a braking force through said pad to a brake rotor, and at least one compressed spring connected to the arming shaft which maintains the arming shaft in an energized condition by a releasable trigger pin connecting said shaft to said caliper, said trigger pin attached to a tether which in turn is adapted to be attached to the driver of an all terrain vehicle;
    whereupon removal of the trigger pin allows said at least one compressed spring to expand thereby moving said arming shall from said energized condition to an activated condition to apply said brake pad to said rotor, via transmission of force through said actuating lever and said connecting element to said brake pad.

2. A braking system for an all terrain vehicle comprising:
    a secondary master cylinder capable of routing hydraulic fluid to actuate at least one brake caliper, said secondary master cylinder comprising:
    a main bore comprising a piston capable of contacting an actuating arm;
    said actuating arm connected at one end to a first portion of said cylinder by a tension spring,
    said arm connected at an opposite end to a second portion of said cylinder by a trigger pin to maintain said arm in an energized condition;
    said trigger pin connected to a tether which is adapted to be attached to the driver of an all terrain vehicle;
    whereupon removal of the trigger pin allows said tension spring to contract causing said actuating arm to contact said piston to pressurize hydraulic fluid at a caliper port to actuate said at least one caliper brake.

* * * * *